Mar. 6, 1923.                                                           1,447,657
                       P. GOUIN ET AL
              ELECTRODE FOR ALKALINE STORAGE BATTERIES
                    Filed Sept. 14, 1920            2 sheets-sheet 1
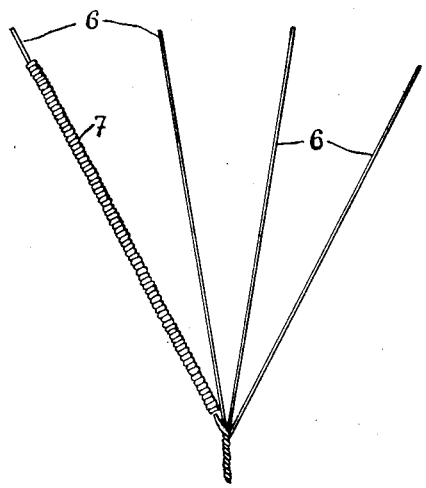
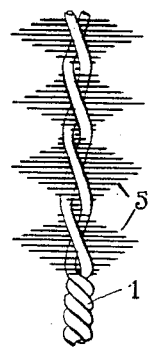
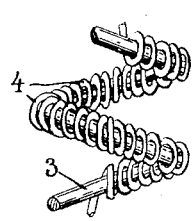
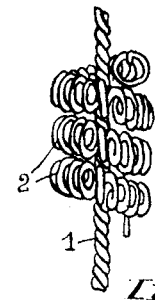
Inventors
P. Gouin
E. Roesel
By H. R. Kerslake
Attorney Mar. 6, 1923. 1,447,657
P. GOUIN ET AL
ELECTRODE FOR ALKALINE STORAGE BATTERIES
Filed Sept. 14, 1920 2 sheets-sheet 2
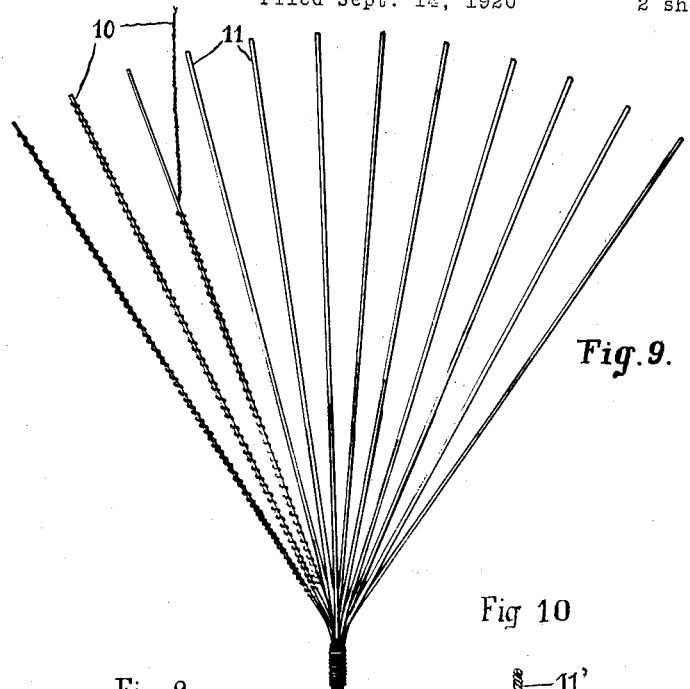
Fig. 9.
Fig 10
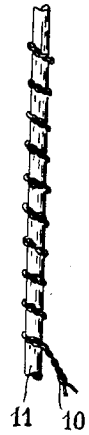
Fig. 8
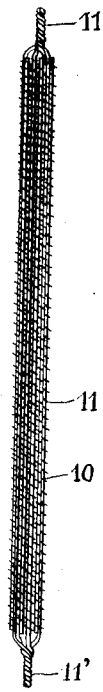
Inventors
P. Gouin
E. Roesel
By H. R. Kerslake
Attorney Patented Mar. 6, 1923.

1,447,657

UNITED STATES PATENT OFFICE.

PAUL GOUIN AND EDMOND ROESEL, OF PARIS, FRANCE.

ELECTRODE FOR ALKALINE STORAGE BATTERIES.

Application filed September 14, 1920. Serial No. 410,335.

*To all whom it may concern:*

Be it known that we, PAUL GOUIN and EDMOND ROESEL, both citizens of the Republic of France, and residing at Paris, France (whose post-office address is 51 Rue Boussingault, Paris, France, XIII), have invented new and useful Improvements in Electrodes for Alkaline Storage Batteries; and we declare the following to be a full, clear, and exact description of the same.

The present invention has for its object a mode of construction of the electrodes of alkaline iron-nickel storage batteries, with gas transfer and insoluble electrode.

Said construction has for its object to reduce notably the cost of manufacture of said elements with respect to the known systems, while increasing the output and the capacity of the elements.

The system is described hereafter with reference to the accompanying drawings, showing, by way of example, several embodiments of electrodes made according to the invention. In said drawings:

Figs. 1, 2, 3 and 4 are partial views, on an enlarged scale, showing several types of metallic structures;

Fig. 5 shows the first step in the construction of one of said types of metallic structures;

Fig. 6 shows, in natural size, a finished metallic structure;

Fig. 7 shows, in natural size, a complete electrode;

Figs. 8, 9 and 10 show another type of metallic structure;

Fig. 8 shows, at a greatly enlarged scale, the construction of one of the metallic rods constituting the bundle;

Fig. 9 shows the provisional connection of said rods;

Fig. 10 shows the finished metallic structure, obtained by forming several of said rods into a bundle.

In all cases, the metallic structure is made of a metallic wire which may be a nickel wire or a nickel-plated iron or steel wire, or even a wire made of another metal.

By reason of the nature of the active material and of the electrolyte, it is better to use nickel,—or nickel-plated iron or steel wire, but this is not a necessary condition.

The metallic structure may affect various dispositions; it may, for instance, consist in a twisted bundle of wires 1, surrounded by a coiled wire 2 (Fig. 1); or in a helix 3 of thick wire, surrounded by a wire coil 4 (Fig. 2); or in a twisted bundle 1 fitted brushwise with radial wires 5 (Fig. 3). It is obvious that many other modifications may occur to those skilled in the art.

A preferred embodiment of the invention is shown in Figs. 4 and 5. A number of wires 6 (Fig. 5) are prepared on each of which a small wire coil 7 is threaded, after which said wires 6 with the surrounding coils 7 are united into a bundle, said bundle being twisted in such a way that the final structure is as shown on a large scale in Fig. 4. A kind of brush is thus obtained, having the form of a cylindrical rod as shown in Fig. 6, and formed of intermingled metallic wires leaving between them a large number of interstices in which the active material can be lodged and retained and, by reason of the very large contact surface between the metallic structure and the active material, the latter will receive the current practically at all points of its mass, and as the current enters and leaves through the central core of the metallic structure, all parts of the active mass are completely utilized, this insuring a particularly good efficiency of the battery.

Figs. 8, 9 and 10 show another form of execution of metallic structure. Said structure is formed of a bundle of rods, each composed as shown at a very large scale in Fig. 8, of a metallic wire 11 surrounded by a cord 10 formed itself of twisted metal wires. The electrode is formed of a number of said rods, fixed together as shown in Fig. 9. The current enters or leaves through one or the two ends 11′ formed by the connected wires 11. The wires 11 may all be connected to one end, or one half may be connected to one end, and the other half to the other end.

The structure thus built up is embedded in a mass of iron or nickel oxide, according to the polarity of the electrode, which is pressed around said structure under a pressure from about 5000 to 8500 pounds per square inch, in order to form a solid rod, the strength of which is sufficient to enable it to be manipulated without danger of the active material getting loose or detached. The electrode is thus complete from an electric point of view. It is then placed in a hull 9, which is only intended for protecting it against shocks and friction. In Fig. 7, which shows a complete electrode, the mass of active material, partly taken away, is designated by 8; inside of said mass, small white lines indicate the metallic structure. The hull 9, which serves only as an envelope and support, may consist in a tube formed of nickel or nickel-plated iron or steel in order not to be submitted, to electrolytic actions, or in a tube of perforated insulating material, or in a metal tube covered by an insulating varnish or coating. In any case, said hull must be perforated or permeable to the electrolyte.

A very handy and strong electrode unit is thus obtained, and with a proper number of said rods connected together, electrodes can be formed similar to storage battery plates.

Although the cylindrical shape of the rods seems preferable, the invention is not limited to such shape, as rods of elliptical or square section, or even in blade form, could be used in the same way. Blades could also be formed comprising several metallic structures.

Having thus described our invention, we declare that what we claim is:—

1. Battery electrodes comprising wire elements twisted together, each of said elements consisting of wires twisted together, and highly compressed active material of low electrical conductivity in which said elements are embedded, said active material extending into the interstices formed by the twisted wires, and said wires extending to the outer surface of the active material.

2. A process for manufacturing an electrode element for alkaline storage batteries, consisting in twisting wires together to form elements, twisting said elements together to form a core, embedding said core in an active material of low electrical conductivity and permitting the intertwisted wires to extend to the outer surface of the active material, and exerting a pressure from about 5000 to 8500 lbs. per square inch on the active material and the core in order to compress the same.

3. A process as claimed in claim 2 including the added stage of placing an envelope permeable to an electrolyte on said active material.

4. A process for manufacturing an electrode element for alkaline storage batteries, consisting in twisting wires containing nickel together to form elements, twisting said elements together to form a core, embedding said core in an active material of metallic oxide and permitting the intertwisted wires to extend to the outer surface of the active material, and exerting a pressure from about 5000 to 8500 pounds per square inch on the active material and the core in order to compress the same.

5. A method of making a battery electrode unit for alkaline accumulators, consisting in forming a core of a plurality of twisted wires, intertwisting other wires in the first mentioned wires, embedding all of said wires in highly compressed active material of low electrical conductivity, and permitting the intertwisted wires to extend to the outer surface of the active material.

In testimony whereof we have signed our names to this specification in the presence of two subscribing witnesses.

PAUL GOUIN.
EDMOND ROESEL.

Witnesses:
CLEMENT S. EDWARDS,
HENRY T. WILCOX.